(No Model.)
J. BERKEY & W. R. FOX.
FURNITURE CASTER.
No. 378,649. Patented Feb. 28, 1888.
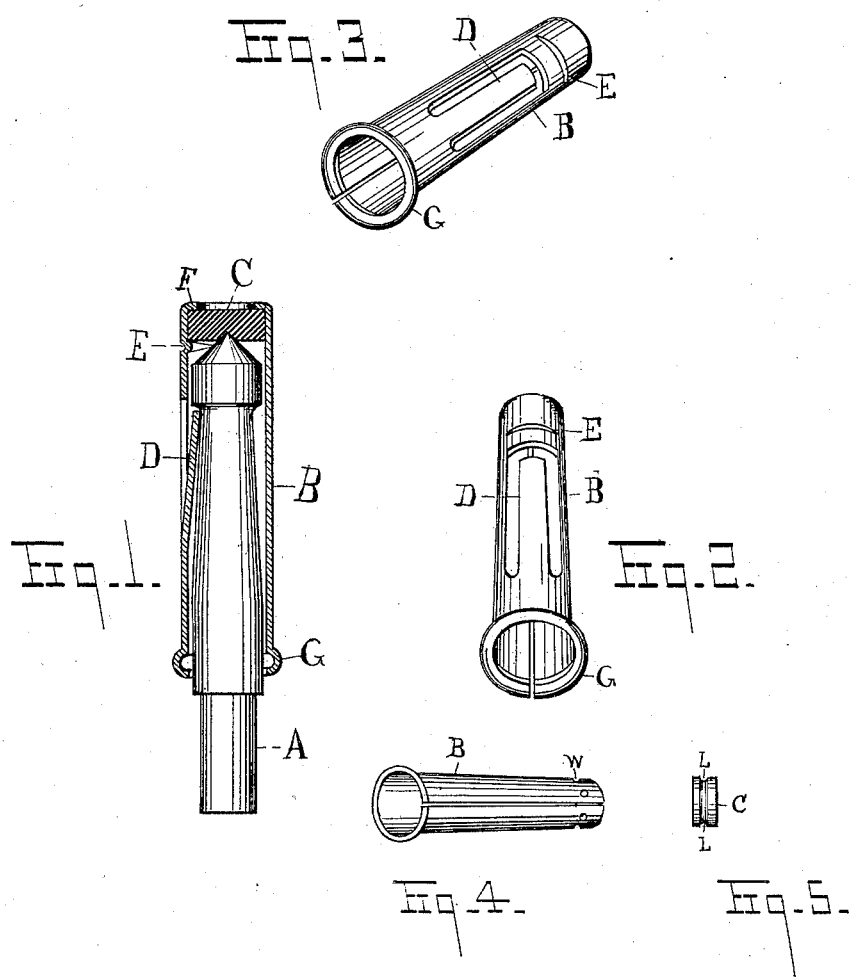
WITNESSES:
Arthur C. Denison.
Allison K. Worden.
INVENTORS.
Julius Berkey.
Wm. R. Fox,
BY
Edward Taggart
their ATTORNEY.

United States Patent Office.

JULIUS BERKEY AND WILLIAM R. FOX, OF GRAND RAPIDS, MICHIGAN, ASSIGNORS TO THE FURNITURE CASTER ASSOCIATION, OF SAME PLACE.

FURNITURE-CASTER.

SPECIFICATION forming part of Letters Patent No. 378,649, dated February 28, 1888.

Application filed November 27, 1885. Serial No. 184,136. (No model.)

*To all whom it may concern:*

Be it known that we, JULIUS BERKEY and WILLIAM R. FOX, both citizens of the United States, residing at the city of Grand Rapids, in the county of Kent and State of Michigan, have jointly invented certain new and useful Improvements in Furniture-Casters, of which the following is a specification.

Our invention relates to the improved caster-socket herein fully described; and the object of our invention is to form a cheap and efficient caster-socket for the reception and, if required, the retention of the shank or spindle of the caster wheel or wheels, as fully set forth in this specification. This object we attain by means of the mechanism illustrated in the accompanying drawings, in which—

Figure 1 is a longitudinal sectional view of a caster-socket constructed in accordance with our invention with the caster-shank in place within the socket. Fig. 2 is a perspective view of the same. Fig. 3 is also a perspective view showing the spring in perspective. Fig. 4 is a modified form of the socket in perspective. Fig. 5 is a modified form of the stop or bearing for the upper end of the caster-shank.

Similar letters refer to similar parts throughout the several views.

The socket is cylindrical in form and preferably composed of a single piece of suitable metal bent round, as shown by B. At the upper end of the socket is a flange, F. This flange, however, may in some forms be dispensed with.

D is a spring made integral with the socket, the free end of which spring extends into the socket a sufficient distance to press against the neck of the shank A and hold said shank in place to prevent it from dropping out when the piece of furniture is lifted from the floor. The shank A is provided with a head or enlarged portion, which passes the spring, as shown in Fig. 1. The object of the spring and shank does not differ in any respect from prior inventions made by us, and therefore needs no further description.

C is a stop or bearing for the shank, and is held in position at the end of the socket by any suitable means. We prefer to fasten it by means of the flange F F at the upper end of the socket, and either by one indentation, E, as shown in Figs. 1, 2, and 3, or by such indentation or sunken portion of the cylinder on each side; but a series of indentations, as shown in Fig. 4 by W, is equally effective.

Instead of making the stop C in the form shown in Fig. 1, it may be constructed with the sunken portion or portions, as shown by L L in Fig. 5, in which case the indentations or depressions in the cylinder will be made to fit into such indentations or depressions in the stop C. It is evident that the form of the stop may be varied, and we do not desire to confine our invention to the particular shape of the stop or the particular method of securing it within the cylinder. We make a strong flange upon the lower end of the cylinder by bending the metal inwardly, as shown in Fig. 1 by G; but this form is not necessary, as the flange can be readily made by turning the metal outwardly, as we have shown it in Fig. 4.

The cylinder is made preferably of thin or sheet metal, and when open on one side it can be struck out in the shape to receive the stop C and the stop C readily driven to its required position within the socket.

Having thus described our invention, what we claim to have invented, and desire to secure by Letters Patent, is—

In a furniture-caster, the cylindrical socket formed of a single piece of wrought or sheet metal, having a spring formed integrally therewith and provided with an interior stop at its upper end, substantially as described.

JULIUS BERKEY.
WILLIAM R. FOX.

Witnesses:
W. R. ADAMS,
ARTHUR C. DENISON.